United States Patent [19]

Tetsuro

[11] 4,104,763
[45] Aug. 8, 1978

[54] APPARATUS FOR CUTTING A STRING OF SAUSAGE LINKS

[75] Inventor: Mano Tetsuro, Sanno, Japan

[73] Assignee: Totai Company Limited, Japan

[21] Appl. No.: 747,722

[22] Filed: Dec. 6, 1976

[51] Int. Cl.² ............................................. A22C 11/00
[52] U.S. Cl. ............................................. 17/1 F; 17/24
[58] Field of Search ............................ 17/1 F, 24, 34; 198/726, 626, 779

[56] References Cited

U.S. PATENT DOCUMENTS

| | | | |
|---|---|---|---|
| 2,702,403 | 2/1955 | Smith | 17/1 F |
| 3,209,397 | 10/1965 | Biderman | 17/34 |
| 3,237,755 | 3/1966 | Weihe, Jr. | 198/779 |
| 3,487,498 | 1/1970 | Grandon et al. | 17/1 F |
| 3,568,242 | 3/1971 | Moore | 17/1 F |
| 3,653,489 | 4/1972 | Tullis et al. | 198/779 |
| 3,659,316 | 5/1972 | Berendt | 17/1 F |
| 3,716,891 | 2/1973 | Demariest | 17/1 F |
| 3,840,937 | 10/1974 | Berg et al. | 17/1 F |
| 4,024,602 | 8/1977 | Stikes | 17/1 F |

Primary Examiner—Louis G. Mancene
Assistant Examiner—Paul J. Hirsch
Attorney, Agent, or Firm—McGlew and Tuttle

[57] ABSTRACT

An apparatus for cutting a string of sausage links at a junction between links to form lengths of one or more links which comprises a conveying device for advancing the string of links, a stretching device for stretching the junction to be cut and a cutting means provided between the conveying device to cut the string at the junction and the stretching device. The conveying device pinches and conveys the string of sausage links the stretching device is desposed downstream of the conveying device and pinches and receives the string of sausage links from the conveying device. The stretching device is coupled to the conveying device for operation therewith at a higher conveying speed to stretch the twisted junction between the sausage links. The cutting means is connected to an electric eye which perceives the twisted junction of the sausage links and operates the cutting means to cut the twisted junction at a cutting station at which the cutting means and electric eye are provided.

7 Claims, 4 Drawing Figures

APPARATUS FOR CUTTING A STRING OF SAUSAGE LINKS

FIELD AND BACKGROUND OF THE INVENTION

This invention relates to an apparatus for exactly and efficiently cutting a string of sausage links, such as vienna sausage, frankfurter or the like, into lengths of one or more pieces.

DESCRIPTION OF THE PRIOR ART

Before this invention, the cutting of a string of sausage links into one or more pieces has been carried out manually or by use of non-automatic machines. Disadvantages of inefficiency and inexact cutting exist in these methods; namely, manual work is inefficient for rapid cutting and non-automatic machines are apt to cut the sausage links at inexact locations or to crush the sausages due to over-pinching.

The present invention is proposed to overcome the above-mentioned defects in the prior arts.

SUMMARY OF THE INVENTION

An object of this invention is to provide an apparatus for cutting a string of sausage links which can exactly and efficiently cut the sausage links into predetermined lengths of one or more pieces.

Another object of this invention is to provide an apparatus for cutting a string of sausage links which can adequately stretch a twisted junction between the sausage links on a cutting device and convey sausages efficiently.

A further object of this invention is to provide an apparatus for cutting a string of sausage links which can exactly cut the sausage links into predetermined lengths of one or more pieces at a ligature or twisted junction of the sausage links string.

An apparatus for cutting a string of sausage links according to this invention comprises a conveying device which pinches and conveys a string of sausage links to a cutting station, a stretching device provided on the downstream and of the conveying device and at a slight distance therefrom operated at a faster rate than the conveying device to adequately stretch a twisted junction between sausage links and convey cut lengths of sausage links out of the apparatus, and a cutting device provided between the conveying device and the stretching device and at the cutting station. The cutting device further includes a cutting means and electric eye connected thereto which perceives a twisted junction between the sausage links for exact cutting of the sausage string.

The electric eye contains a count memory means in a circuit to control the cutting operation of the cutting means for severing predetermined lengths of one or more sausage links.

The apparatus of the invention can thus adequately stretch a twisted junction between sausage links which is conveyed into the cutting station by the differential in advancing speeds of the conveying device and the stretching device. The electric eye perceives the stretched-twisted junction and electrically operates the cutting means to cut the string at this junction.

BRIEF DESCRIPTION OF THE DRAWINGS

This invention will be illustrated in detail by way of examples in the accompanying drawings, in which;--

DESCRIPTION OF THE PREFERRED EMBODIMENT

Figure 1:
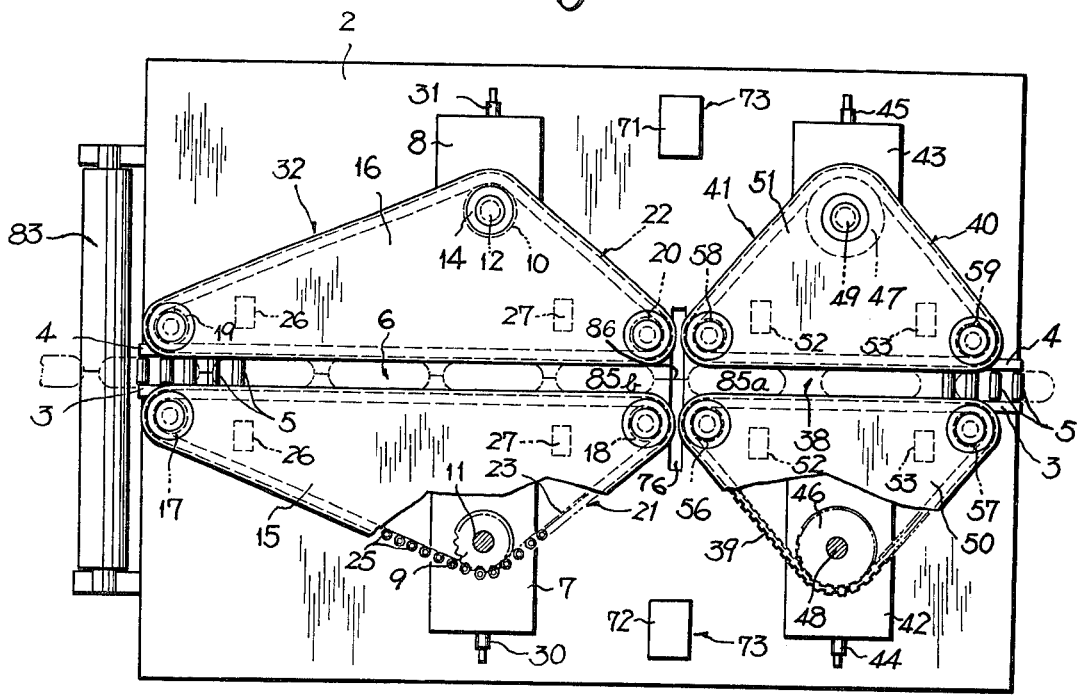
FIG. 1 is a partly sectioned plan view of the preferred embodiment of this invention.
Figure 2:
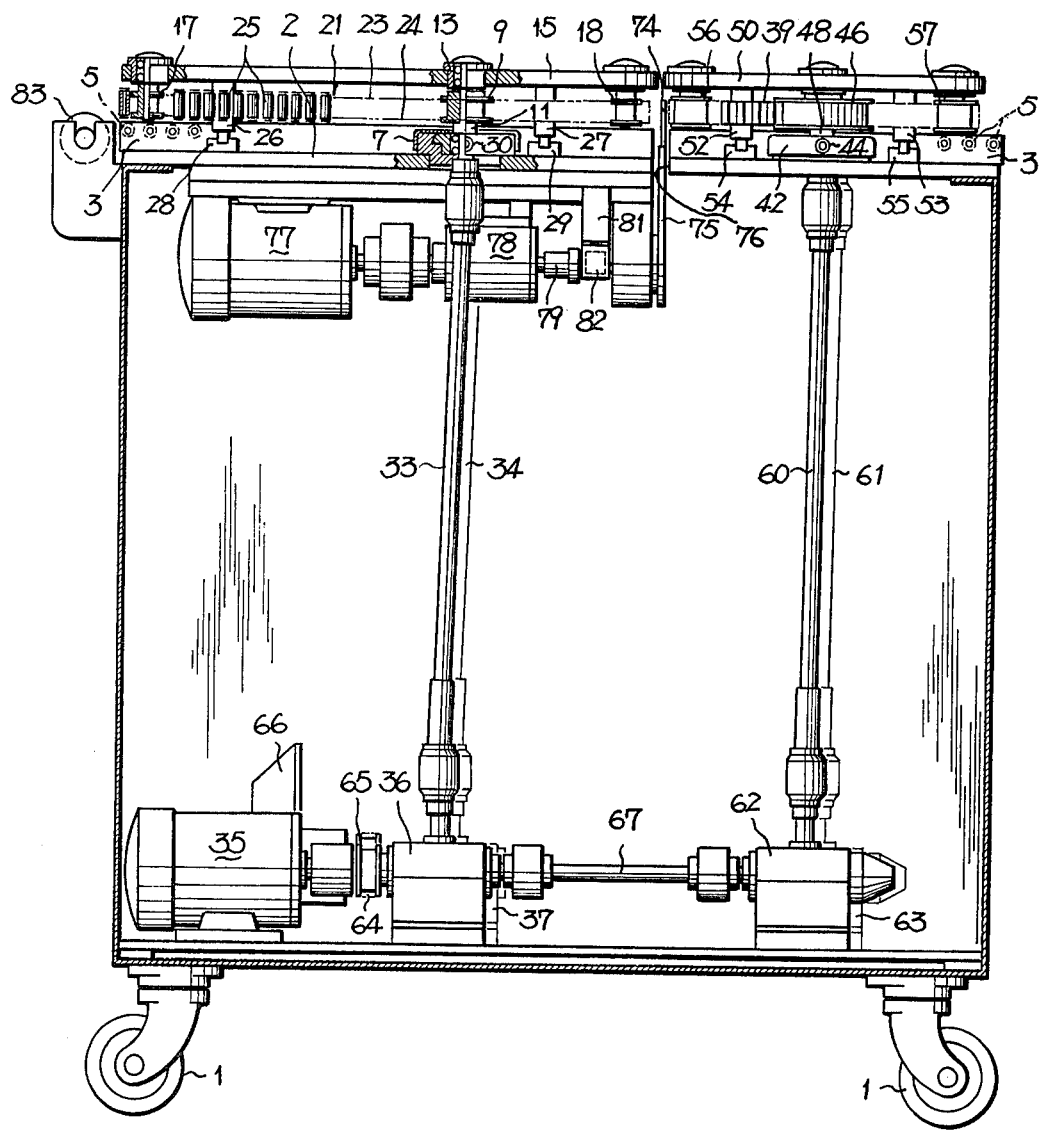
FIG. 2 is a side elevational view of the embodiment of FIG. 1.
Figure 3:
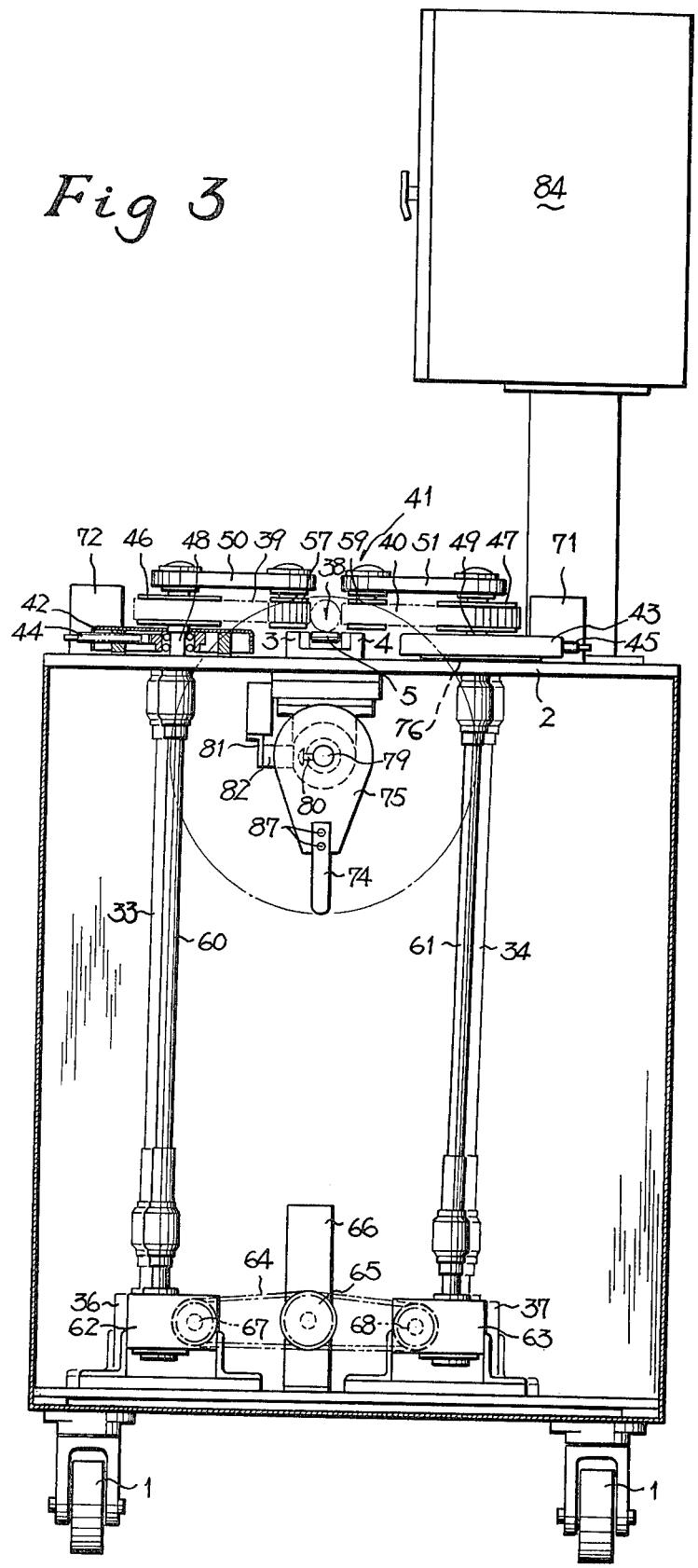
FIG. 3 is a front elevational view of the embodiment of FIG. 1.

Referring now to the drawings, particularly to FIGS. 1, 2 and 3, a table 2, per se movable with casters 1, is provided with a passageway 6 comprising side members 3, 4 and a plurality of free rolls 5 confined between the side members 3, 4. The passageway 6 is arranged on the table 2 longitudinally along the center line of the table 2. On both sides of the passageway 6, there are provided transversely movable bearings 7, 8. Driving sprocket wheels 9, 10 are provided on the upper portions of driving shafts 11, 12, which are rotatably journalled in the movable bearing 7, 8, respectively. Thereby, each driving sprocket wheels 9, 10 is movable toward and away from the passageway 6.

On the top of the driving shafts 11, 12, there are provided plates 15, 16 which engage shafts 11, 12 through bearings 13, 14, respectively. Each plate 15, 16 extends inwardly and is supported by leg 26, 27 which engage railways 28, 29, transversely arranged on the table. Under each plate 15, 16 there are provided pairs of guide sprocket wheels 17, 18 and 19, 20 along the passageway 6. Endless belts 21, 22 engage with wheels 9, 17, 18 and 10, 19, 20 respectively and each comprise an upper chain 23 and a lower chain 24. A plurality of rollers 25 are mounted for rotation between chains 23 and 24 and form the sides of passage 6. The rollers bear against lateral sides of the sausage links to pinch them and allow the moving belts 21, 22 to convey the sausage links string forward.

Roller belts 21, 22 are mounted to table 2 for movement toward and away from passageway 6 for adjusting a breadth of the passageway 6 in accordance with different sausage widths by the movement of bearing 7, 8 which is adjusted by bolts 30, 31 respectively.

Each driving shaft 11, 12 of the driving sprocket wheel 9, 10 is connected to universal shaft 33, 34, having universal joints on both ends thereof, through the bearing 7, 8. The universal shafts 33, 34 extend downwardly and connect to reduction gear devices 36, 37 respectively. Each reduction gear device 36, 37 is connected connects to an electric motor 35 for driving each roller belt 21, 22 at similar and in the and counterclockwise directions respectively.

The passageway 6 and the endless roller belts 21, 22 comprise a conveying means 32.

At the downstream end of the conveying device 32, there is provided a stretching means 41 comprising a passageway 38 and endless belts 39, 40 which have inner and outer surfaces provided with notching or knurling. The stretching means 41 is constructed similar to the conveying means 32 except for differences in lengths and advancing speed of the endless belts.

In the stretching device 41, driving shafts 48,49 are rotatably journalled in movable bearings 42, 43 and are provided with pulleys 46, 47 having matched or knurled surfaces. Triangular mounted plates 50, 51 are positioned over pulleys 46 47 and provide an upper mounting for driving shafts 48, 49. Each plate 50, 51 extends invwardly, and is support by legs 52, 53 which engage transverse railways 54, 55. A pair of guide pulleys 56, 57 and 58, 59 are mounted for rotation on respective plates 50, 51. The belts 39, 40 are fitted around each group of driving and guide pulleys 46, 56, 57 and 47, 58, 59. Each belt 39, 40 is movable toward and away from passageway 38 in a manner similar to the roller belts 21, 22, by adjusting bolts 44, 45.

As shown in FIGS. 2 and 3, each driving shaft 48, 49 is connected to a universal shaft 60, 61, having universal joints on both ends thereof, through the bearing 42, 43 and each universal shaft 60, 61 extends downwardly and is connected to reduction gear device 62, 63. Each reduction gear device 62, 63 is connected to the electric motor 35 through belts and pulleys. Thus, by driving the motor 35, belts 39, 40 are respectively advanced clockwise and counterclockwise.

Driving means which drive each belt 21, 22, 39, 40, comprises electric motor 35 having a pulley 65 supported by a member 66 and connecting shafts 67, 68 interconnecting each pair of reduction gear devices 36, 62 and 37, 63. Shafts 67, 68 are connected to the pulley 65 through a belt 64.

Each driving pulley 46, 47 of the stretching means 41 may be of a diameter twice that of the driving sprocket wheels 9, 10 of the conveying means 32. In such a construction, the driving rates of the shafts 11, 12 and 48, 49 are kept equal so that the advancing speed of the belts 39, 40 is greater than that of the roller belts 21, 22.

While, differences in advancing speed of the conveying means and the stretching means can be effected by differences in the size of the driving sprocket wheels 9, 10 and driving pulleys 46, 47, changing the gears of reduction gear devices 36, 37 and 62, 63 can also effect this difference.

Figure 4:
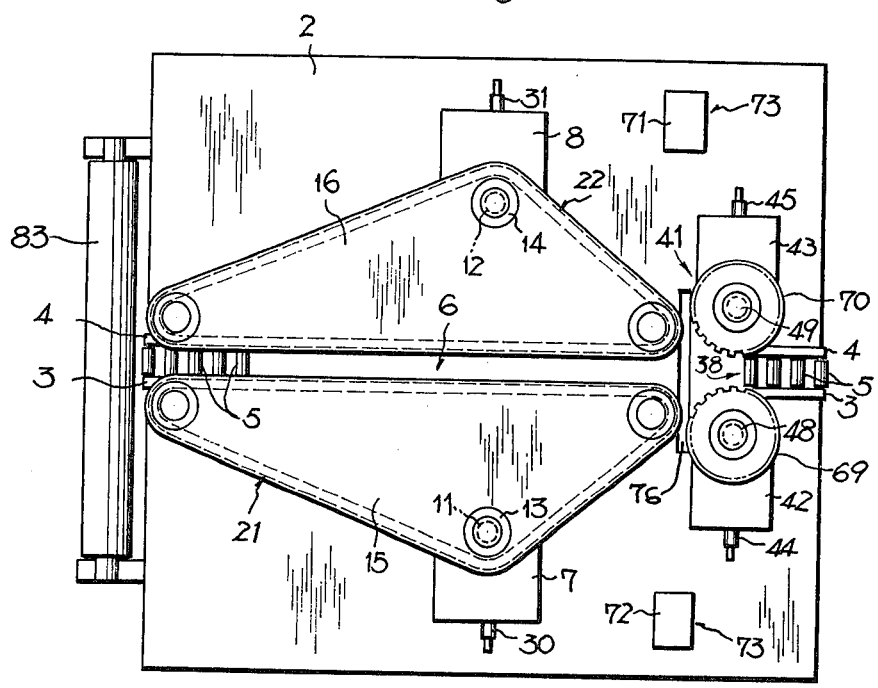
FIG. 4 is a sectioned plan view of another embodiment of this invention.

In another embodiment of the invention, the belts 39, 40 of the stretching means 41 are substituted for rotating wheels 69, 70 which have larger diameters than sprocket wheels 9, 10. Wheels 69, 70 are notched or knurled, as shown in FIG. 4 to engage with the sausage link. The rolls 69, 70 are provided adjacent the conveying device 32 and on both sides of passageway 38. They are movable toward and away from the passageway 38 and driven by the motor 35 through the reduction gear devices 62, 63, similarly to belts 39, 40.

This differential in advancing speeds causes the sausage string to be streched at the twisted junction between links in the area between the conveyor means or device 32 and the stretching means or device 41. The use of rollers 35 in the belts 21, 22 also advantageously effects the feeding of the sausage string in that the links are pinched between the opposed belts to advance the string and at the same time allow for a forward displacement of the string due to the pull of the stretching means 41, in case this pull threatens to stretch the twisted junction to the breaking point. In the area between the conveying device and the stretching device, is disposed a cutting station for cutting a string of sausage links at a twisted junction or ligature between links. Electric eye 73 comprised a ray shooting means 71 and a ray receiving means 72 is provided side of the cutting station on the table 2. The ray shooting means 71 directs a ray of light toward the ray receiving means 72 across the cutting station to perceive the twisted junctions between sausage links as they pass. There is further provided a cutting means at the cutting station comprising a rotating plate 75 on which is bolted a cutting edge 74 protruding outwardly and fastened by bolts 87. The locus of rotation of the cutting edge 74 is provided to rotate at the cutting station and to protrude upwardly through a slot 76 provided at the cutting station in the table 2. The rotating plate 75 is secured on the end of a rotating shaft 79 connecting to an electric motor 77 through clutch member 78 and provided with an iron post 80 thereon. A proximity switch is mounted on a member 81 adjacent shaft 79.

The electric eye and the clutching member are interconnected to an electric circuit in a control box 84 to drive the motor 77 for rotating plate 75, at the time when the electric eye 73 perceives the stretched-twisted junction of sausage links pass the cutting station.

A control means such as control box 84 can be provided with a count memory means in the electric circuit for the electric eye 73 to effect the cutting timing for cutting a string of sausage links into lengths of one or more links.

In the drawings, 83 is a feeding roller provided on the front or upstream side of the apparatus, and 84, the control box, may further control the whole electric system of the apparatus.

In the operation, on starting electric motor 35, each universal shaft 36, 37, 60, 61 is driven through each reduction gear device 33, 34, 62, 63, thus driving each driving shaft 11, 12, 48, 49 and advancing each roller belt 21, 22 and belt 39, 40 clockwise and counterclockwise, respectively.

Since the driving pulleys 46, 47 provided on the driving shafts 48, 49 are larger than the driving sprockets 9, 10 in diameters, and are driven at similar speed, the belts 39, 40 advance at higher speed than that of the roller belts 21, 22.

A string of sausage links fed from the feeding roller 83 are conveyed in the passageway 6 by proceeding roller belt 21, 22 forming side walls of the passageway 6 and pinching the sausage links with rollers 25.

The sausage links conveyed by the conveying device 32 are fed into the stretching device 41 and over the cutting station formed between the conveying device 32 and the stretching device 41. A twisted junction of the sausage links is adequately stretched at the cutting station by difference of conveying speed, namely, a sausage 85a pinched and conveyed by the stretching device 41 is conveyed at for example, twice the speed of a sausage 85b remaining in the conveying device 32, thus the twisted portion junction 86 of the sausage links between sausages 85a and 85b is stretched.

Then the twisted portion 86 is stretched and made more slender, light from the ray shooting means 71 reaches to the ray receiving means 72. Thereby, the electric eye 73 perceive the stretched-twisted junction 86 of the sausage links and causes the clutch member 78 to engage to rotate the rotating plate 75 with the cutting edge 74 to cut the strong at the junction. On rotation of the rotating plate 75, the iron post 80 provided on the rotating shaft 79 approaches to the proximity switch 82, the plate 75 then stops by the disengaging of the clutching member 78 and positions the cutting edge 74 under the table 2. The control box 84 provides the control of these operations.

At last, the cut lengths of one or more links of sausage are further conveyed to an of the apparatus downstream of means 41.

This invention constructed as above-mentioned can provide an apparatus for cutting a string of sausage links which is able to cut exactly and efficiently to overcome the defects in the prior art.

Further, this invention can provide an apparatus for cutting a string of sausage links which is able to pinch the sausage links without crushing them, by pinching with a plurality of roller of the conveying device provided between each pair of chains and the belts of the stretching device can effect feeding by the adequate friction of notching or knurling on its belts.

Furthermore, the each roller belt engaged around the sprocket wheels and pulleys is movable toward and away from the passageway for adapting to the feeding of different sausage links.

Moreover, it is greatly hygienic and economic for the cutting edge to be bolted to the rotating plate so it can be easily exchanged or cleaned.

While specific embodiments of the invention has been shown and described and described in detail to illustrate the application of the principles of the invention, it will be understood that the invention may be embodied otherwise without departing from such principles.

What is claimed is:

1. An apparatus for cutting a string of sausage links at a junction between links comprising, conveyor means for advancing the links at a first speed including a pair of spaced apart opposed movable roller belts defining a passageway for the links, each roller belt having a plurality of spaced rotatably mounted rollers disposed therealong engageable with respective lateral sides of the links to pinch them and advance the string as the roller belts move and drive means connected to said roller belts for moving them along said feed passageway, stretching means spaced from said conveyor means for receiving the links from said conveyor means and for further advancing the links at a second speed greater than said first speed to stretch each junction between links as it passes between said conveyor and stretching means, said stretching means including a pair of opposed movable notched members engageable with respective lateral sides of said links to pinch the links and drive means connected to said notched members to move them, cutting means disposed between said conveyor and stretching means for cutting a selected one of the stretched junctions to divide the sausage string into lengths of at least one link including a cutting member movable in the space between said conveyor and stretching means and drive means connected to said cutting member for moving it, and control means connected to said cutting means including a sensor for sensing the passage of each stretched junction and activate said cutting member drive means when a selected one of said stretched junctions passes said sensor.

2. An apparatus according to claim 1, wherein said notched members comprise spaced-apart, opposed movable notched belts defining a second passageway for the links.

3. An apparatus according to claim 1, wherein said notched members comprise space-apart, opposed contrarotatable notched wheels engageable with lateral respective sides of the links.

4. An apparatus according to claim 1, wherein said sensor comprises an electric eye having a ray shooting means disposed on one lateral side of the space between said conveyor and stretching means and a ray-receiving means disposed on an opposite lateral side of the space between said conveyor and stretching means for receiving light from said ray-shooting means directed across the passageway of the links.

5. An apparatus according to claim 1, wherein said cutting member comprises a rotatable plate having a bolted-on blade portion movable across the passageway in the space between said conveyor and stretching means.

6. An apparatus according to claim 1, wherein said pair of opposed roller belts and said notched members are laterally movable toward and away from the links to accommodate links of different diameters.

7. An apparatus according to claim 1, wherein said control means includes a count memory means for selecting the stretched junction to be cut.

* * * * *